(12) United States Patent
Greenwood

(10) Patent No.: US 7,544,726 B2
(45) Date of Patent: Jun. 9, 2009

(54) COLLOIDAL SILICA COMPOSITION

(75) Inventor: Peter Greenwood, Göteborg (SE)

(73) Assignee: Akzo Nobel N.V., Arnhem (NL)

( * ) Notice: Subject to any disclaimer, the term of this patent is extended or adjusted under 35 U.S.C. 154(b) by 114 days.

(21) Appl. No.: 10/683,349

(22) Filed: Oct. 14, 2003

(65) Prior Publication Data

US 2004/0077768 A1   Apr. 22, 2004

(30) Foreign Application Priority Data

Oct. 14, 2002   (EP) ................... 02445132

(51) Int. Cl.
*C08K 9/06*   (2006.01)
(52) U.S. Cl. ..................... 523/212; 524/493
(58) Field of Classification Search ............ 523/212; 524/493
See application file for complete search history.

(56) References Cited

U.S. PATENT DOCUMENTS

| | | | | |
|---|---|---|---|---|
| 2,630,410 | A |  | 3/1953 | Clapsadle ................ 252/313 |
| 4,927,749 | A |  | 5/1990 | Dorn ........................ 435/2 |
| 4,927,750 | A | * | 5/1990 | Dorn ........................ 435/2 |
| 5,013,585 | A |  | 5/1991 | Shimizu .................. 427/220 |
| 5,368,833 | A |  | 11/1994 | Johansson ............... 423/338 |
| 5,651,921 | A |  | 7/1997 | Kaijou .................... 252/309 |
| 5,853,809 | A | * | 12/1998 | Campbell et al. ....... 427/407.1 |
| 6,727,309 | B1 |  | 4/2004 | Paiva et al. |
| 6,793,728 | B1 | * | 9/2004 | Davies et al. ............ 106/600 |

FOREIGN PATENT DOCUMENTS

| | | | |
|---|---|---|---|
| EP | 0216047 |  | 4/1987 |
| EP | 996 588 | * | 11/2001 |
| GB | 1342787 |  | 1/1974 |
| JP | 56-86980 |  | 7/1981 |
| JP | 3-31380 A |  | 6/1989 |
| JP | 7-86183 |  | 9/1995 |
| JP | 10-059708 |  | 3/1998 |
| WO | 99/36359 |  | 7/1999 |
| WO | 00/55260 | * | 9/2000 |
| WO | 0148098 |  | 7/2001 |
| WO | 01/87788 |  | 11/2001 |
| WO | WO 2004/033575 A1 |  | 4/2004 |

OTHER PUBLICATIONS

Patent Abstracts of Japan, Pub. No. 03031380, Pub. Date Feb. 12, 1991.; Applicant: Daihachi Chem Ind Co Ltd.
English language abstract of JP 03258878.
Iler, Ralph K., The Chemistry of Silica; John Wiley & Sons (1979); pp. 407-409.
Iler and Dalton, "Degree of Hydration of Particles of Colloidal Silica in Aqueous Solution," J. Phys. Chem. 60(1956), pp. 955-957.
Use of (Glycidoxypropyl)trimethoxysilane as a Binder in Colloidal Silica Coatings, Chu et al, Chem. Mater. 1997, 9, 2577-2582.
Office Action received in corresponding Japanese Application No. 2004-545121.
English language translation of Office Action received in corresponding Japanese Application No. 2004-545121.
Patent Abstracts of Japan for JP 56-086980.
Patent Abstracts of Japan for JP 10-059708.
English Translation of Japanese Patent Application JP H10-059708.

* cited by examiner

*Primary Examiner*—Kuo-Liang Peng
(74) *Attorney, Agent, or Firm*—David J. Serbin; Robert C. Morriss

(57) ABSTRACT

The invention relates to a method of producing a stable substantially aqueous silanized colloidal silica dispersion having a silica content of at least about 20 wt %, comprising mixing at least one silane compound and colloidal silica particles, wherein the weight ratio of silane to silica is from about 0.003 to about 0.2. The invention also relates to a dispersion obtainable by the method, and to a stable substantially aqueous silanized colloidal silica dispersion having a silica content of at least about 20 wt %, wherein the weight ratio of silane to silica is from about 0.003 to about 0.2. The invention further concerns the use of the dispersion for coatings applications and as an additive.

20 Claims, No Drawings

COLLOIDAL SILICA COMPOSITION

The present invention relates to a stable substantially aqueous silanized colloidal silica dispersion, a method of producing such dispersion, and the use thereof.

BACKGROUND OF THE INVENTION

Colloidal silica dispersions have been used for a long time, e.g. as a coating material to improve adhesive properties as well as increasing wear and water resistance of various materials. However, these dispersions, especially highly concentrated colloidal silica dispersions, are liable to gelling or precipitation of silica, which makes longer storage impossible.

English language abstract of JP 3258878 discloses a coating composition prepared by blending an alkoxysilane with a silica sol prepared by reacting a hydrosilicofluoric acid or ammonium salt thereof with ammonia in an aqueous medium, separating formed precipitated silica from the aqueous medium and grinding the precipitated silica in wet state.

It would be desirable to provide a stable and highly concentrated colloidal silica dispersion which can be easily stored and transported without substantial precipitation, even below the freezing point, and that can be used in applications requiring improved adhesive properties, wear resistance, and/or water resistance. It would also be desirable to provide a convenient and inexpensive method of producing such a dispersion. A further object of the present invention is to provide such a stable dispersion which minimises the environmental impact thereof.

THE INVENTION

The invention relates to a method of producing a stable substantially aqueous silanized colloidal silica dispersion having a silica content of at least about 20 wt % comprising mixing at least one silane compound and colloidal silica particles, wherein the weight ratio of silane to silica is from about 0.003 to about 0.2, preferably from about 0.006 to about 0.15, and most preferably from about 0.015 to about 0.1.

The mixing is preferably carried out at a temperature below about 50° C., more preferably below about 35° C. Temperatures above about 50° C. may result in at least partial self-condensation of the silane which reduces the stability of the dispersion, the adhesive properties as well as the wear and water resistance properties the dispersion imparts. The time of mixing is not critical but is suitably up to about 3 hours, preferably up to about 2 hours. However, a dispersion may only need up to about 10 minutes, or preferably only up to about 5 minutes, or most preferably only up to 1 minute of mixing depending on the types of silane and colloidal silica particles mixed. Preferably, silane is added to the colloidal silica particles. Preferably, the silane is diluted before mixing it with colloidal silica particles, which are preferably dispersed in an aqueous silica sol. Preferably, silane is diluted with water to form a premix of silane and water, suitably in a weight ratio from about 1:8 to about 8:1, preferably from about 3:1 to about 1:3, and most preferably from about 1.5:1 to about 1:1.5. The resulting solution is substantially clear and stable and easy to add to the colloidal silica particles. The time of mixing the colloidal silica particles and premixed aqueous silane is suitably up to about 5 minutes, preferably up to about 1 minute.

The mixing according to the invention may be carried out at a pH from about 1 to about 13, preferably from about 6 to about 12, and most preferably from about 7.5 to about 11.

By the term "stable", particularly in the context "stable substantially aqueous silanized colloidal silica dispersion" is meant that the dispersion or the silanized colloidal silica particles dispersed therein, does not substantially gel or precipitate within a period of preferably at least about 2 months, more preferably at least about 4 months, and most preferably at least about 5 months at normal storage in room temperature (20° C.).

Preferably, the relative increase in viscosity of the dispersion two months after the preparation thereof is lower than about 100%, more preferably lower than about 50%, and most preferably lower than about 20%.

Preferably, the relative increase in viscosity of the dispersion four months after the preparation thereof is lower than about 200%, more preferably lower than about 100%, and most preferably lower than about 40%.

Colloidal silica particles, which here also are referred to as silica sols, may be derived from e.g. precipitated silica, micro silica (silica fume), pyrogenic silica (fumed silica) or silica gels with sufficient purity, and mixtures thereof.

Colloidal silica particles and silica sols according to the invention may be modified and can contain other elements such as amines, aluminium and/or boron, which can be present in the particles and/or the continuous phase. Boron-modified silica sols are described in e.g. U.S. Pat. No. 2,630,410. The aluminium modified silica particles suitably have an $Al_2O_3$ content of from about 0.05 to about 3 wt %, preferably from about 0.1 to about 2 wt %. The procedure of preparing an aluminium modified silica sol is further described in e.g. "The Chemistry of Silica", by Iler, K. Ralph, pages 407-409, John Wiley & Sons (1979) and in U.S. Pat. No. 5,368,833.

The colloidal silica particles suitably have an average particle diameter ranging from about 2 to about 150 nm, preferably from about 3 to about 50 nm, and most preferably from about 5 to about 40 nm. Suitably, the colloidal silica particles have a specific surface area from about 20 to about 1500, preferably from about 50 to about 900, and most preferably from about 70 to about 600 $m^2/g$.

The colloidal silica particles preferably have a narrow particle size distribution, i.e. a low relative standard deviation of the particle size. The relative standard deviation of the particle size distribution is the ratio of the standard deviation of the particle size distribution to the mean particle size by numbers. The relative standard deviation of the particle size distribution preferably is lower than about 60% by numbers, more preferably lower than about 30% by numbers, and most preferably lower than about 15% by numbers.

The colloidal silica particles are dispersed in a substantially aqueous solvent, suitably in the presence of stabilising captions such as $K^+$, $Na^+$, $Li^+$, $NH_4^+$, organic captions, primary, secondary, tertiary, and quaternary amines, and mixtures thereof so as to form an aqueous silica sol. However, also dispersions comprising organic solvents miscible with water, e.g. lower alcohols, acetone or mixtures thereof may be used, preferably in an amount of from about 1 to about 20, more preferably from about 1 to about 10, and most preferably from about 1 to about 5 volume percent of the total volume. However, aqueous silica sols without any further solvents are preferably used. Preferably, the colloidal silica particles are negatively charged. Suitably, the silica content in the sol is from about 20 to about 80, preferably from about 25 to about 70, and most preferably from about 30 to about 60 wt %. The higher the silica content, the more concentrated the resulting silanized colloidal silica dispersion. The pH of the silica sol suitably is from about 1 to about 13, preferably from about 6 to about 12, and most preferably from about 7.5 to about 11. However, for aluminium-modified silica sols, the pH suitably is from about 1 to about 12, preferably from about 3.5 to about 11.

The silica sol preferably has an S-value from about 20 to about 100, more preferably from about 30 to about 90, and most preferably from about 60 to about 90.

It has been found that dispersions with an S-value within these ranges can improve the stability of the resulting dispersion. The S-value characterises the extent of aggregation of colloidal silica particles, i.e. the degree of aggregate or microgel formation. The S-value has been measured and calculated according to the formulas given in J. Phys. Chem. 60(1956), 955-957 by Iler, R. K. & Dalton, R. L.

The S-value depends on the silica content, the viscosity, and the density of the silica sol. A high S-value indicates a low microgel content. The S-value represents the amount of $SiO_2$ in percent by weight present in the dispersed phase of the silica sol. The degree of microgel can be controlled during the production process as further described in e.g. U.S. Pat. No. 5,368,833.

The silane compounds can form stable covalent siloxane bonds (Si—O—Si) with the silanol groups or be linked to the silanol groups, e.g. by hydrogen bondings, on the surface of the colloidal silica particles.

Suitable silane compounds include tris-(trimethoxy)silane, octyl triethoxysilane, methyl triethoxysilane, methyl trimethoxysilane; isocyanate silane such as tris-[3-(trimethoxysilyl)propyl]isocyanurate; gamma-mercaptopropyl trimethoxysilane, bis-(3-[triethoxysilyl]propyl)polysulfide, beta-(3,4-epoxycyclohexyl)-ethyl trimethoxysilane; silanes containing an epoxy group (epoxy silane), glycidoxy and/or a glycidoxypropyl group such as gamma-glycidoxypropyl trimethoxysilane, gamma-glycidoxypropyl methyldiethoxysilane, (3-glycidoxypropyl)trimethoxy silane, (3-glycidoxypropyl) hexyltrimethoxy silane, beta-(3,4-epoxycyclohexyl)-ethyltriethoxysilane; silanes containing a vinyl group such as vinyl triethoxysilane, vinyl trimethoxysilane, vinyl tris-(2-methoxyethoxy)silane, vinyl methyldimethoxysilane, vinyl triisopropoxysilane; gamma-methacryloxypropyl trimethoxysilane, gamma-methacryloxypropyl triisopropoxysilane, gamma-methacryloxypropyl triethoxysilane, octyltrimethyloxy silane, ethyltrimethoxy silane, propyltriethoxy silane, phenyltrimethoxy silane, 3-mercaptopropyltrimethoxy silane, cyclohexyltrimethoxy silane, cyclohexyltriethoxy silane, dimethyldimethyoxy silane, 3-chloropropyltriethoxy silane, 3-methacryoxypropyltrimethoxy silane, i-butyltriethoxy silane, trimethylethoxy silane, phenyldimethylethoxy silane, hexamethyldisiloxane, trimethylsilyl chloride, vinyltriethoxy silane, hexamethyldisilizane, and mixtures thereof. U.S. Pat. No. 4,927,749 discloses further suitable silanes which may be used in the present invention. The most preferred silanes, however, are epoxy silanes and silanes containing a glycidoxy or glycidoxypropyl group, particularly gamma-glycidoxypropyltrimethoxysilane and/or gamma glycidoxypropyltmethyldiethoxysilane.

According to a preferred embodiment, an organic binder is subsequently mixed with the dispersion of silanized colloidal silica particles. The term "organic binder" includes latex, water soluble resins, polymers and mixtures thereof. Water soluble resins and polymers can be of various types such as e.g. poly(vinyl alcohols), modified poly(vinyl alcohols), polycarboxylates, poly(ethylene glycols), poly(propylene glycols), polyvinylpyrrolidones, polyallylamines, poly (acrylic acids), polyamidamines, polyacrylamides, polypyrroles, proteins such as casein, soybean proteins, synthetic proteins, polysaccharides such as cellulose derivatives such as methylcelluloses, ethylcelluloses, hydroxyethylcelluloses, methylhydroxyethylcelluloses, ethylhydroxyethylcelluloses or carboxymethylcelluloses, starches or modified starches; chitosan, polysaccharide gums such as e.g. guar gums, arabic gums, xanthan gums and mastic gums and mixtures or hybrids thereof. The term "latex" includes synthetic and/or natural latices based on emulsions of resins and/or polymers of various types, e.g. styrene-butadiene polymers, butadiene polymers, polyisoprene polymers, butyl polymers, nitrile polymers, vinylacetate homopolymers, acrylic polymers such as vinylicacrylic copolymers or styrene-acrylic polymers, polyurethane polymers, epoxy polymers, cellulosic polymers such as micro cellulose, melamine resins, neoprene polymers, phenol based polymers, polyamide polymers, polyester polymers, polyether polymers, polyolefin polymers, polyvinyl butyral polymers, silicones; e.g. silicone rubbers and silicone polymers (e.g. silicone oils), urea-formaldehyde polymers, vinyl polymers or mixture or hybrids thereof.

Preferably, the organic binder is mixed with the silanized silica particles in a weight ratio of silica to organic binder from about 0.01 to about 4, more preferably from about 0.1 to about 2, and most preferably from about 0.2 to about 1.

The invention also relates to a stable substantially aqueous silanized colloidal silica dispersion obtainable by the method.

The invention further concerns a stable substantially aqueous silanized colloidal silica dispersion having a silica content of at least about 20 wt %, wherein the weight ratio of silane to silica in the dispersion is from about 0.003 to about 0.2, preferably from about 0.006 to about 0.15, and most preferably from about 0.015 to about 0.1.

The weight of silane in the dispersion is calculated as the total amount of possible free silane compounds and silane derivatives or groups bound or linked to the silica particles.

Highly concentrated silanized colloidal silica dispersions, besides being more efficient, also reduce the drying time after application, e.g. on a material to be coated. The energy used for drying can thus be considerably reduced. A high silica content in the dispersion is preferred as long as the silanized colloidal silica particles remain stably dispersed without any substantial aggregation, precipitation and/or gelation. Preferably, the silica content in the dispersion is from about 20 to about 80, more preferably from about 25 to about 70 and most preferably from about 30 to about 60 wt %. This is beneficial also in view of the reduced transportation cost thereof.

The stability of the dispersion facilitates the handling thereof since it allows for storage and need not be prepared on site immediately before usage, and does not contain any hazardous amounts of harmful solvents.

The substantially aqueous dispersion preferably does not contain any organic solvent. However, according to one embodiment, an organic solvent may be comprised in the aqueous dispersion in an amount of from about 1 to about 20, preferably from about 1 to about 10, and most preferably from about 1 to about 5 volume percent of the total volume. This is due to the fact that for some applications, a certain amount of organic solvents may be present without any substantial detrimental effects.

The dispersion may contain besides silanized colloidal silica particles also, at least to some extent, non-silanized colloidal silica particles depending on the size of the silica particles, weight ratio of silane to silica, type of silane compounds, reaction conditions etc. Suitably, at least about 40 wt % of the colloidal silica particles are silane-modified, preferably at least about 65 wt %, more preferably at least about 90 wt %, and most preferably at least about 99 wt %. The silanized colloidal silica dispersion may comprise besides silane in the form of silane groups or silane derivatives bound or linked to the surface of the silica particles also at least to some extent freely dispersed unbound silane compounds. Suitably, at least about 40, preferably at least about 60, more preferably at least about 75, even more preferably at least about 90, and most preferably at least about 95 wt % of the silane compounds are bound or linked to the surface of the silica particles. Thus, by this method, the silica particles are surface-modified.

Preferably, from about 1 to about 90%, more preferably from about 5 to about 80, and most preferably from about 10 to about 50% by number of the silanol groups on the colloidal silica particles that are capable of binding or linking to the silane groups bind a silane group. Preferably, the colloidal silica particles bind or link from about 0.1 to about 5.5, more preferably from about 0.25 to about 4, and most preferably from about 0.5 to about 2.5 silane groups or derivatives/$nm^2$ on the surface area thereof.

According to a preferred embodiment, the silanized colloidal silica dispersion comprises an organic binder, preferably a latex, as further described herein. The total solid content of the dispersion comprising organic binder and silanized colloidal silica particles suitably is from about 20 to about 80, preferably from about 25 to about 65, and most preferably from about 30% to about 50 wt %. The weight ratio of silica to organic binder on a dry base is suitably in the range from about 0.05 to about 4, preferably from about 0.1 to about 2, and most preferably from about 0.2 to about 1.

The dispersion comprising organic binders is capable of forming a coating film on various kinds of substrates.

According to a preferred embodiment, the silanized colloidal silica particles and the organic binder are present as discrete particles in the dispersion.

The invention also relates to the use of the silanized colloidal silica dispersion in coating applications but also as an additive to impart increased adhesiveness, improved wear resistance, and/or water resistance to e.g. adhesion promotors, laminating agents, sealants, hydrophobising agents, cementitious materials, in foundry applications such as precision investment casting and refractory fiber bounding, lining slurries/dispersions for e.g. furnaces; catalysts, detergents, and wafer polishing slurries. Suitable materials to be coated include construction materials such as bricks, ceramic materials, cement and concrete; photo paper, wood, metal surfaces such as steel or aluminium, plastic films such as e.g. polyester, PET, polyolefins, polyamide, polycarbonates, or polystyrenes; and fabrics. The silanized colloidal silica dispersion may also be used to control the hydrophilicity of ink jet coating layer so as to enhance both ink adhesion and water resistance in ink jet applications including ink jet coatings on e.g. paper, plastics, fabrics, glass, ceramics, cementitious material, metal, and wood. The silanized colloidal silica dispersion may also be used in stabilising emulsions to control the hydrophilic balance. The silanized colloidal silica dispersion may also be used as pigment dispersant e.g. by combining good wetting and dispersing properties.

The invention being thus described, it will be obvious that the same may be varied in many ways. Such variations are not to be regarded as a departure from the gist and scope of the present invention, and all such modifications as would be obvious to one skilled in the art are intended to be included within the scope of the claims. While the examples here below provide more specific details of the reactions, the following general principles may here be disclosed. The following examples will further illustrate how the described invention may be performed without limiting the scope of it.

All parts and percentages refer to part and percent by weight, if not otherwise stated.

EXAMPLES

The silanes A and B used below are available from Crompton S.A. in Switzerland.

A: Silquest Wetlink 78 (glycidoxy-containing epoxy-silane),

B: Silquest A-187 (glycidoxy-containing epoxy-silane)

The silica sols used in the examples below available from Eka Chemicals AB, Sweden, are shown in table 1 below:

TABLE 1

| Sol No | Silica sol | Silica content (wt %) | Particle size, (nm) | Specific surface area ($m^2$/g) | Surface modification | pH |
|---|---|---|---|---|---|---|
| A1 | Bindzil ® 30/220 | 30 | 12 | 220 | None | 9-10 |
| A2 | Nyacol ® 1430 LS | 30 | 11 | 240 | None | 8-9 |
| A3 | Bindzil ® 305/220 | 30 | 12 | 220 | Aluminium | 9-10 |
| A4 | Nyacol ® DP 5110 | 30 | 11 | 250 | Aluminium | 6-7 |
| A5 | Bindzil ® 30/360 | 30 | 7 | 360 | None | 9-10 |
| A6 | Bindzil ® 40/130 | 40 | 22 | 130 | None | 9-10 |

Preparation of Silanized Colloidal Silica Dispersions

Silane samples A and B were added dropwise to the silica sols at moderate agitation for about 5 minutes in accordance with table 2. The agitation was continued for about 2 hours. Premixed samples of water-diluted silane were prepared by mixing water and silane in equal amounts (see table 4). The mixtures were slowly agitated until clear solutions were obtained. The aqueous silane were then mixed with a silica sol under moderate agitation. All samples were prepared at room temperature, unless otherwise stated.

TABLE 2

| Silanized silica sol No | Silica sol | Colloidal silica weight (g) | Silane | Silane weight (g) | Stable silanized silica sol |
|---|---|---|---|---|---|
| 1 | A1 | 30 | A | 1 | YES |
| 2 | A2 | 30 | A | 1 | YES |
| 3 | A3 | 30 | A | 1 | YES |
| 4 | A4 | 30 | A | 1 | YES |
| 5 | A1 | 30 | B | 1 | YES |
| 6 | A3 | 30 | B | 1 | YES |
| 7 | A5 | 30 | B | 3 | YES |
| 8 | A6 | 40 | B | 2 | YES |

Table 2 shows that all obtained silanized silica sols were stable in the above weight ratios. The term "stable" as used in table 2 means dispersions that do not become white, do not gel and do not precipitate within 5 month at normal storage in room temperature. Table 3 shows further samples of prepared silanized silica sols.

TABLE 3

| Silanized silica sol No | Silica sol | Colloidal silica weight (g) | Silane | Silane weight (g) | Stable product |
|---|---|---|---|---|---|
| 9 | A3 | 30 | B | 10 | NO |
| 10 | A1 | 30 | B | 10 | NO |
| 11 | A3 | 30 | B | 1 | YES |

Table 3 shows the influence of the weight ratio of silane to silica. A too high weight ratio renders the silanized silica sol unstable as can be seen from products no. 9 and 10, which are outside the scope of the claimed invention, whereas product 11 according to the invention is stable.

TABLE 4

| Silanized colloidal silica No | Silica sol | Colloidal silica weight (g) | Silane diluted in water (1:1) | Weight (g) (silane-water solution; 1:1) | Stable product |
|---|---|---|---|---|---|
| 13 | A1 | 30 | B | 20 | NO |
| 14 | A1 | 30 | B | 5 | YES |
| 15 | A5 | 30 | A | 6 | YES |
| 16 | A5 | 450 | A | 75 | YES |
| 17 | A5 | 450 | B | 75 | YES |
| 18 | A3 | 600 | A | 60 | YES |

Table 4 also shows that the silanized silica sols (products 14-18 according to the invention) are stable in contrast to product 13 (reference product) where the weight ratio silane to silica is too high.

Water Resistance

The water resistance of the dispersions according to the invention were evaluated by mixing 10 g of the silanized silica sols with 20 g of "soft latex", Mowilith LDM 7602S available from Celanese (cf. films 7-11, 13). Films 1-4 did not contain silanized silica particles and films 5 and 6 were prepared by first mixing 0.5 g of silane:water solutions (1:1) with 20 g of the same "soft latex" and then mixing the silane-latex mixture with 9.5 g of silica sol A5. Films were cast using 2 g of the above prepared latex mixtures. The films were aged for 16 hours at room temperature. The water resistance was then evaluated by adding 2 drops of water on top of the aged films. 10 minutes after the water addition, the water impact was analysed, categorised and listed in table 4 in accordance with the following scale;
0: film "dissolved",
1: severe impact on the film
2: some impact on the film,
3: no impact.

TABLE 5

| Sample/ Film No | (Silanized) silica sols | Premix of silane and silica | Water Resistance |
|---|---|---|---|
| 1 | A1 | NO | 1 |
| 2 | A3 | NO | 0 |
| 3 | A5 | NO | 1 |
| 4 | A6 | NO | 1 |
| 5 | A5 | NO, A* | 1 |
| 6 | A5 | NO, B** | 1 |
| 7 | 1 | YES | 2 |
| 8 | 3 | YES | 2 |
| 9 | 14 | YES | 2 |
| 10 | 15 | YES | (2)-3 |
| 11 | 16 | YES | 2-(3) |

TABLE 5-continued

| Sample/ Film No | (Silanized) silica sols | Premix of silane and silica | Water Resistance |
|---|---|---|---|
| 13 | 8 | YES | 2 |
| 15 | 13 | YES | White film |

*0.5 g of silane A, i.e. Silquest A-187:H$_2$O (1:1), was first added to 20 g of the soft latex (acrylic resin) and then 9.5 g of A5 (30/360). The film was cast directly after mixing the three components.
**0.5 g of silane B, i.e. Wetlink 78:H$_2$O (1:1), was first added to 20 g of the soft latex (acrylic resin) and then 9.5 g of A5 (30/360). The film was cast directly after mixing the three components.

Table 5 shows reference films of mixtures of non-silanized silica sols and soft latex (films 1-4) which have very poor water resistance. Films 5-6, which were prepared by adding silica sol to the already prepared latex-silane mixture, also showed very poor water resistance. Films 7-11 and 13, particularly 10-11, however, show good or excellent water resistance. These films were prepared by mixing latex and premixtures of silica sol and silane. Film 15 became white (unstable) due to too high weight ratio of silane to silica.

Evaluation of Coatings on Concrete Blocks

Two concrete blocs (no. 1 and 2) with the dimensions 13 cm×19 cm were coated with 10 g of silanized silica sols (cf. table 6). Bloc no. 3 was treated only with silica sol and bloc 4 was untreated. The water resistance was evaluated 5 minutes after addition of 3 drops of water on top of the old film aged for 16 hours. The spread of water (mean value of the drop diameter on the treated concrete surface in the length and width directions) and the absorption of water from the surface were evaluated.

TABLE 6

| Bloc No | Silica sol | spread (mm) | Water remains on bloc surface | Note |
|---|---|---|---|---|
| 1 | 15 | 30 | YES | |
| 2 | 16 | 30 | YES | |
| 3 | A5 | 45 | NO | |
| 4 | No sol | 35 | NO | Water absorbs within 10-20 seconds |

From table 6 it can be noticed that both the spread and the water absorption decrease due to the surface treatment with silanized silica sol compared to blocs 3 and 4 (references). This indicates that the silanized sol renders the bloc surface more hydrophobic and water resistant.

Freezing Stability

Samples of 100 ml sol was put into the freezer for 24 h at −20° C. The samples stood 16 h in room temperature before evaluation (cf. observation cycle 1). The process was repeated once (cf. observation cycle 2). The samples were evaluated optically. As a result, it was noted that a clear low viscous aqueous dispersion with only traces of precipitates of the silanized silica sol was seen for silanized sol No 16 whereas sol No A5 precipitated totally and became non-fluid.

TABLE 7

| No | Sol Sample | Observation cycle 1 | Observation cycle 2 |
|---|---|---|---|
| 1 | 16 | very few small flakes/precip. | very few small flakes/precip. |
| 2 | A5 | White precipitates - no sol | White precipitates - no sol |

Viscosity at High Colloidal Silica Concentration

The silica sols were concentrated by vacuum evaporation at 60° C. in a 20 l rotary evaporator. The time for concentration was 2 hours. The silica sols were then diluted to desired silica content with de-ionised water (cf. table 8 below). The viscosity was measured at 20° C. by a Brookfield viscometer both initially and after 4 months storage in room temperature. As can be seen from table 8 below, the silanized sol offers better stability against gelling and viscosity increase. For the silanized sol the viscosity decreases over time, even at very high silica concentrations! This indicates increased stability against gelling and viscosity increase. The silanized colloidal silica products can therefor be produced and stored at higher silica concentrations than non-silanized colloidal silica and still have a low viscosity that makes handling easier.

TABLE 8

| Sol No | Colloidal silica (%) | Viscosity (cP), initial | Viscosity (cP), 4 months |
|---|---|---|---|
| A3 | 46.0 | 50.1 | gelled after 61 days |
| A3 | 44.0 | 30.1 | 626 |
| A3 | 42.0 | 19.9 | 31.5 |
| 18 | 47.3 | 91.5 | 65.0 |
| 18 | 46.0 | 64.1 | 38.5 |
| 18 | 44.0 | 36.6 | 20.8 |
| 18 | 42.0 | 23.0 | 13.8 |

The invention claimed is:

1. A method of producing a stable aqueous silanized colloidal silica dispersion without the presence of any water-miscible organic solvents or optionally comprising one or more water-miscible organic solvents, if present, in a total amount of up to about 5 % by volume of the total volume, said dispersion having a silica content of at least 20 wt%, said method comprising mixing at least one silane compound and colloidal silica particles in an aqueous silica sol having an S-value from 30 to 90 in a weight ratio of silane to silica from 0.003 to 0.2.

2. A method according to claim 1, wherein the mixing is carried out at a temperature below about 50° C.

3. A method according to claim 1, wherein the mixing is carried out at a pH from about 6 to about 12.

4. A method according to claim 1, wherein said at least one silane compound is an epoxy silane.

5. A method according to claim 1, wherein said at least one silane compound is an epoxy silane with a glycidoxy group.

6. A method according to claim 1, comprising mixing an organic binder with the dispersion.

7. A method according to claim 6, wherein the organic binder is a latex.

8. A stable aqueous silanized colloidal silica dispersion without the presence of any water-miscible organic solvents or optionally comprising one or more water-miscible organic solvents, if present, in a total amount of up to about 5 % by volume of the total volume, said dispersion having a silica content of at least 20 wt% obtained by mixing colloidal silica particles and at least one silane compound in an aqueous silica sol having an S-value from 30 to 90 in a weight ratio of silane to silica from 0.003 to 0.2.

9. A stable aqueous silanized colloidal silica dispersion without the presence of any water-miscible organic solvents or optionally comprising one or more water-miscible organic solvents, if present, in a total amount of up to about 5 % by volume of the total volume, said dispersion having a silica content of at least 20 wt% and having a weight ratio of silane to silica from 0.003 to 0.2, wherein colloidal silica particles are dispersed in a silica sol having an S-value from 30 to 90.

10. A dispersion according to claim 9, further comprising an organic binder.

11. A dispersion according to claim 9, further comprising a latex.

12. A dispersion according to claim 9, wherein the weight ratio of silane to silica is from about 0.006 to about 0.15.

13. A dispersion according to claim 9, wherein the weight ratio of silane to silica is from about 0.015 to about 0.1.

14. A dispersion according to claim 9, wherein the silica content in the dispersion is from about 25 to about 70 wt%.

15. A dispersion according to claim 9, wherein the silica content in the dispersion is from about 30 to about 70 wt%.

16. A dispersion according to claim 1, wherein the dispersion remains stable for at least 5 months storage at 20° C.

17. A dispersion according to claim 1, wherein the dispersion viscosity does not increase more than about 40% for a period of at least 4 months storage at 20° C.

18. A dispersion according to claim 9, wherein the dispersion remains stable for at least 5 months storage at 20° C.

19. A dispersion according to claim 9, wherein the dispersion viscosity does not increase more than about 40% for a period of at least 4 months storage at 20° C.

20. A dispersion according to claim 17, wherein the dispersion viscosity does not increase for a period of at least 4 months storage at 20° C.

* * * * *

UNITED STATES PATENT AND TRADEMARK OFFICE
CERTIFICATE OF CORRECTION

| | | |
|---|---|---|
| PATENT NO. | : 7,544,726 B2 | Page 1 of 1 |
| APPLICATION NO. | : 10/683349 | |
| DATED | : June 9, 2009 | |
| INVENTOR(S) | : Peter Greenwood | |

It is certified that error appears in the above-identified patent and that said Letters Patent is hereby corrected as shown below:

Claim 10, column 10, line 26
"A dispersion according to claim 9, further comprising"
should read
-- A dispersion according to claim 9 further comprising --

Claim 11, column 10, line 28
"A dispersion according to claim 9, further comprising a"
should read
-- A dispersion according to claim 9 further comprising a --

Signed and Sealed this
Fifth Day of July, 2011

David J. Kappos
*Director of the United States Patent and Trademark Office*